M. F. SCOFIELD.
SHIRT COLLAR SUPPORT.
APPLICATION FILED JULY 30, 1914.
1,123,936.
Patented Jan. 5, 1915.
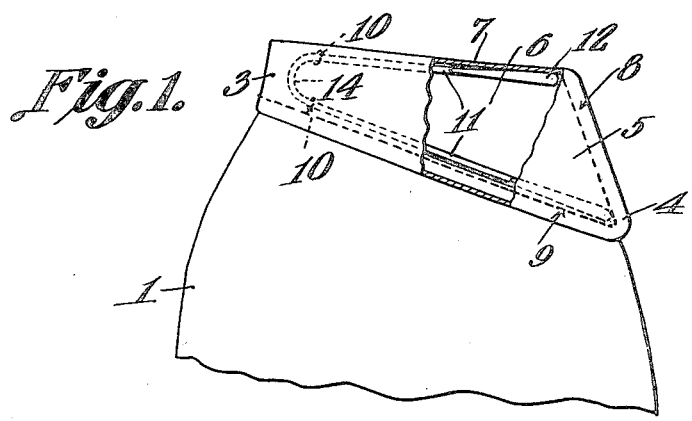
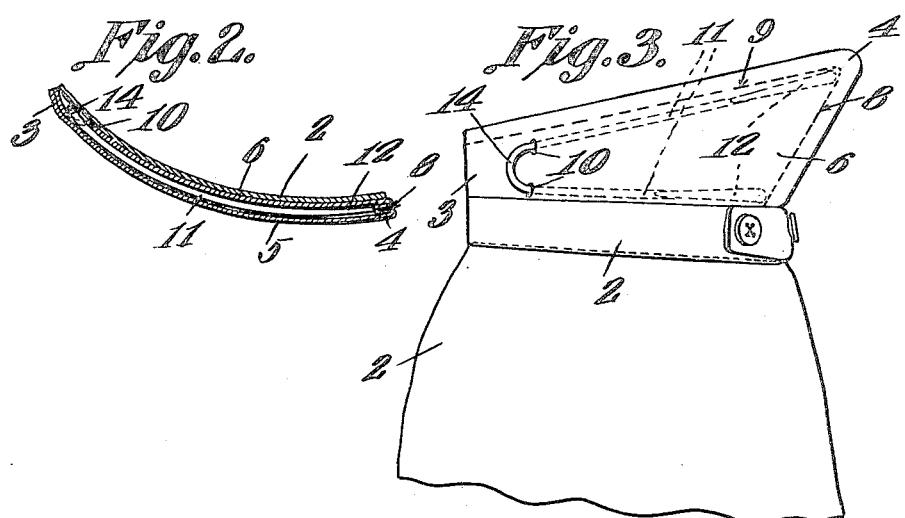
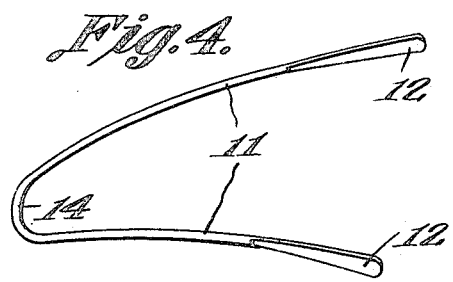
Witnesses
Moses F. Scofield,
Inventor
by
Attorneys

UNITED STATES PATENT OFFICE.

MOSES F. SCOFIELD, OF REQUA, CALIFORNIA.

SHIRT-COLLAR SUPPORT.

1,123,936.  Specification of Letters Patent.  Patented Jan. 5, 1915.

Application filed July 30, 1914. Serial No. 854,183.

*To all whom it may concern:*

Be it known that I, MOSES F. SCOFIELD, a citizen of the United States, residing at Requa, in the county of Del Norte and State of California, have invented a new and useful Shirt-Collar Support, of which the following is a specification.

The device forming the subject matter of this application is adapted to be employed for supporting a soft turnover collar of the sort commonly found upon a negligée or working shirt.

The invention aims to provide a collar support which may be inserted readily in place in the collar and with equal facility be removed therefrom, the device being housed in an out-of-the-way and inconspicuous position when in use.

Another object of the invention is to provide a device of the sort above mentioned which will stretch the tab or depending portion of the turnover collar along its upright forward edge.

It is within the scope of the invention to improve generally and to enhance the utility of device of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:—Figure 1 shows in side elevation, a shirt collar equipped with the device forming the subject matter of this application, parts being broken away; Fig. 2 is a longitudinal section taken through the collar and showing the collar support in position; Fig. 3 is a side elevation, the collar being turned up in order that the rear end portion of the collar support and its relation to the inner layer of the collar may clearly appear; Fig. 4 is a perspective showing the support.

In the accompanying drawings there is shown a shirt 1 provided with a neck band 2 carrying a collar 3 of soft, turnover variety, the collar 3 comprising tabs 4. The collar 3 is composed of an outer layer 5 and an inner layer 6. The roll of the collar is shown at 7. The constituent layers 5 and 6 of the collar are united along or near their forward edges by a line of stitching indicating at 8 and a line of stitching indicated at 9 unites the layers adjacent their lower edges. In the inner layer 6 of the collar are formed spaced openings 10, located at some distance to the rear of the forward edge of the tab 4.

The collar support proper is in the form of an arched or U-shaped spring and comprises diverging, resilient arms 11, the arms 11 being flattened at their outer ends as shown at 12, to prevent the arms from punching through the walls of the collar and to render the arms better adapted to serve as supports for the collar.

The arms 11 are inserted through the openings 10 in the inner layer 6 and extend forwardly to the line of stitching indicated at 8, the arms engaging the line of stitching indicated at 9 and the roll 7 of the collar, to uphold the collar as shown in Fig. 1. The bend 14 of the support lies between the inner layer 6 of the collar and the neck band 2. The bend 14 serves as a finger hold, whereby the support may be withdrawn from the collar when desired.

Preferably, the support is curved slightly, so as to conform to the horizontal curvature of the collar.

The forwardly presented arms 11 are under compression when inserted into the collar, and when released, serve to support the collar and to stretch the collar along its forward or upright edge.

In practice, one support is mounted in each of the tabs 4. Owing to the fact that the free ends of the support are forwardly presented, the collar at its forward ends is yieldingly upheld. Consequently, when the chin of the wearer is depressed, the collar may be compressed, but when the chin of the wearer is elevated, the collar will resume the upstanding position shown in Fig. 1 of the drawings.

Having thus described the invention, what is claimed is:—

In a device of the class described, a garment having a turnover collar including a depending tab comprising inner and outer layers; an arched spring comprising forwardly presented, free-ended resilient arms, both of which arms lie partly between the said layers of the depending tabs and engage the upper and lower portions of the collar to support the same, the bend of the arched spring protruding through the inner layer and being located between the inner layer and the garment, the free ends of the arms being located close to the forward edge of the tab to effect a resilient stretching of said edge.

In testimony that I claim the foregoing as my own, I have hereto affixed my signature in the presence of two witnesses.

MOSES F. SCOFIELD.

Witnesses:
   I. L. SCOTT,
   I. A. SAFFORD.